(12) United States Patent
Pauli et al.

(10) Patent No.: US 7,990,311 B2
(45) Date of Patent: Aug. 2, 2011

(54) ADAPTIVE CLUTTER FILTER FOR MARITIME SURFACE SEARCH RADAR

(75) Inventors: Mark D. Pauli, West Hills, CA (US); Jason Blind, Huntington Beach, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 12 days.

(21) Appl. No.: 12/610,252

(22) Filed: Oct. 30, 2009

(65) Prior Publication Data

US 2011/0102247 A1   May 5, 2011

(51) Int. Cl.
*G01S 7/292* (2006.01)
(52) U.S. Cl. .......... 342/159; 342/162; 342/91; 342/189; 342/195; 342/196
(58) Field of Classification Search .......... 342/159–162, 342/89, 91–93, 98, 189, 192, 195–196
See application file for complete search history.

(56) References Cited

U.S. PATENT DOCUMENTS

| | | |
|---|---|---|
| 3,735,400 A | 5/1973 | Sletten et al. |
| 3,882,498 A | 5/1975 | McGuffin |
| 3,993,994 A | 11/1976 | Goggins |
| 4,024,541 A | 5/1977 | Albanese et al. |
| 4,028,697 A | 6/1977 | Albanese et al. |
| 4,068,231 A | 1/1978 | Wilmot |
| 4,086,590 A | 4/1978 | Goggins, Jr. |
| 4,488,154 A | 12/1984 | Ward |
| 4,652,881 A | 3/1987 | Lewis |
| 4,825,213 A | 4/1989 | Smrek |
| 4,829,306 A * | 5/1989 | Gjessing et al. ............... 342/159 |
| 4,924,229 A | 5/1990 | Eichel et al. |
| 5,113,193 A | 5/1992 | Powell et al. |
| 5,160,931 A | 11/1992 | Brown |
| 5,539,412 A | 7/1996 | Mendelson |
| 5,563,601 A | 10/1996 | Cataldo |
| 5,703,593 A | 12/1997 | Campbell et al. |

(Continued)

FOREIGN PATENT DOCUMENTS

EP    1136948 A1 *  9/2001

(Continued)

OTHER PUBLICATIONS

Proakis et al., "Algorithms for Statistical Signal Processing" ('Overlap-Save Method'), Prentice Hall, ISBN 0-13-062219-2, (2002), pp. 50-51.

(Continued)

*Primary Examiner* — John B Sotomayor
(74) *Attorney, Agent, or Firm* — Nixon Peabody LLP

(57) ABSTRACT

A time sequence of raw radar data for a region of space is subdivided into a plurality of processing frames. The processing frames are subdivided into a plurality of processing cells and iteratively processed by selecting a single processing cell for processing, transforming the radar data of the processing cell to form transformed radar data in either the time domain or the Fourier domain. The transformed data is converted to a Power Spectrum Density Matrix in the case of the Fourier domain and a Time Space Correlation Matrix in the case of the time domain. This is smoothed and thresholded and then the clutter for the processing cell is estimated. Estimated local non-speckle clutter is estimated and removed from the transformed radar data, with the cleaned transformed radar data converted back to the time domain if required.

32 Claims, 8 Drawing Sheets

U.S. PATENT DOCUMENTS

| | | | |
|---|---|---|---|
| 5,708,436 A | | 1/1998 | Loiz et al. |
| 5,812,082 A | * | 9/1998 | Moreira et al. ............. 342/25 A |
| 6,028,549 A | * | 2/2000 | Buckreuss et al. ............ 342/159 |
| 6,166,678 A | | 12/2000 | Jao |
| 6,188,348 B1 | * | 2/2001 | Raney ............................. 342/22 |
| 6,400,306 B1 | | 6/2002 | Nohara et al. |
| 6,603,424 B1 | | 8/2003 | Abatzoglou |
| 6,633,253 B2 | | 10/2003 | Cataldo |
| 6,697,010 B1 | | 2/2004 | Lam |
| 6,963,599 B1 | * | 11/2005 | Dunn ............................ 375/132 |
| 7,006,034 B1 | | 2/2006 | Krikorian et al. |
| 2004/0233102 A1 | | 11/2004 | Baugh et al. |
| 2006/0072816 A1 | | 4/2006 | Szajnowski et al. |
| 2006/0140249 A1 | * | 6/2006 | Kohno ........................... 375/130 |
| 2006/0181451 A1 | | 8/2006 | Samson |
| 2008/0001808 A1 | | 1/2008 | Passarelli et al. |
| 2008/0120528 A1 | * | 5/2008 | Sawada .......................... 714/780 |
| 2010/0228530 A1 | * | 9/2010 | Valero et al. ....................... 703/2 |

FOREIGN PATENT DOCUMENTS

| | | | |
|---|---|---|---|
| JP | 2001242244 A | * | 9/2001 |
| JP | 2011038948 A | * | 2/2011 |

OTHER PUBLICATIONS

Ousborne et al., "A Periscope Detection Radar," Johns Hopkins APL Technical Digest, vol. 18, No. 1 (1997), pp. 125-133.

Glass, Jon W., "Periscope Pursuit—New Breed of U.S. Navy Radars Would Reveal Stealthy Subs," DefenseNews, (Nov. 17, 2008.).

International Search Report and Written Opinion for International Application No. PCT/US10/53876, mailed Dec. 22, 2010.

Ward, K. D. et al., "Maritime Surveillance Radar. Part 1 : Radar Scattering From the Ocean Surface," IEE Proceedings, vol. 137, Pt. F, No. 2, Apr. 1990, pp. 51-62.

* cited by examiner

US 7,990,311 B2

ADAPTIVE CLUTTER FILTER FOR MARITIME SURFACE SEARCH RADAR

TECHNICAL FIELD

The present disclosure relates generally to an adaptive clutter filter for use with maritime surface search radars.

BACKGROUND

Maritime surface search radars are used in a number of applications such as navigation, search and rescue, law enforcement, defense and the like. They may be sea-based, as on a ship or boat, they may be land-based, as at a shore installation, or they may be air-based, as on an airplane or air ship equipped with radar.

A basic problem with utilizing the data produced by such radars is that the desired information, such as radar scattering from a person or vessel, can be obscured by two forms of sea clutter due to radar reflections from the water surface. A first type of sea clutter is speckle noise scatter which is essentially uncorrelated and random and is caused by effectively random scattering of a portion of the incident radar signal back to the radar unit by the overall water surface. A second type of sea clutter is correlated sea clutter and is due to scattering of the radar signal due to the height, shape and aspect both of waves in the water and of breaking wave events.

Correlated sea clutter tends to degrade the performance of all maritime surface search radars, particular in higher sea state conditions, and it would be desirable to provide a method and apparatus for reducing the effects of sea clutter so as to provide increased performance for maritime surface search radars.

OVERVIEW

In one aspect, a method and apparatus is provided which receives a time sequence of raw radar data for a region of space, subdivides the raw radar data into a plurality of processing frames, for each processing frame, subdivides the processing frame into a plurality of processing cells and iteratively processes the processing cells of a processing frame by selecting a single processing cell for processing, transforming the radar data of the processing cell to form transformed radar data (e.g., by taking its natural logarithm), performing a Fourier transform to convert the transformed radar data from the time domain to the Fourier domain (FD) to form FD radar data, converting the FD radar data to a FD Power Spectrum Density (FDPSD), smoothing the FDPSD, thresholding the FDPSD based upon a threshold parameter (which may be operator controlled), estimating the clutter for the processing cell, estimating the non-speckle clutter for the processing cell, filtering the FD radar data in the Fourier domain by removing the estimated non-speckle clutter from the transformed radar data to form filtered FD radar data, and performing an inverse Fourier transform to convert the filtered FD radar data back to the time domain. The processing cells may then be converted back into filtered processing frames, and ultimately into filtered radar data.

In another aspect, a method and apparatus is provided which receives a time sequence of raw radar data for a region of space, subdivides the raw radar data into a plurality of processing frames, for each processing frame, subdivides the processing frame into a plurality of processing cells and iteratively processes the processing cells of a processing frame by selecting a single processing cell for processing, transforming the radar data of the processing cell to form transformed radar data (e.g., by taking its natural logarithm), converting the transformed radar data to a Time Space Correlation Matrix (TSCM), smoothing the TSCM, thresholding the TSCM based upon a threshold parameter (which may be operator controlled), estimating the clutter for the processing cell, estimating the non-speckle clutter for the processing cell, filtering the transformed radar data in the time domain by removing the estimated non-speckle clutter from the transformed radar data to form filtered radar data. The processing cells may then be converted back into filtered processing frames, and ultimately into filtered radar data.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
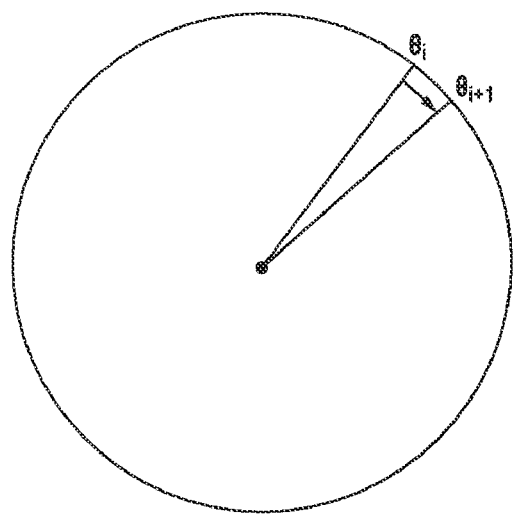
FIG. 1 is an illustration of an azimuthal slice of radar data taken between the angle $\Theta_i$ and the angle $\Theta_{i+1}$.

Example embodiments are described herein in the context of a system which is configured to receive data from a radar device. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Radar Sea Clutter

Radar sea clutter is a form of backscatter noise and can be characterized as a compound distribution formed from two distinct statistical processes (Ward, K. D., et al., (1990), *Maritime Surveillance Radar Part 1: Radar Scattering from the Ocean Surface*, IEE Proc. F, Radar & Signal Process, 137, (2), pp. 51-62). The radar sea clutter in each range-scan cell consists of a rapidly varying speckle noise component modulated by a slowly varying correlated mean noise level. The speckle noise component is uncorrelated from one cell to the next and has a (complex Gaussian) probability distribution function determined solely by the mean noise level and the central limit theorem. It poses little problem in the use of maritime surface search radars. The correlated noise, however, can obscure targets of interest to users of such radar systems and subsequently degrade performance.

Because the mean noise level varies slowly with respect to the radar resolution in range and time, a form of local averaging allows its estimation. Subsequent normalization of the radar data by the estimated local mean noise can now remove much of the problematic correlated noise. A method for estimating the local mean noise intensity (essentially a modification of a Wiener filter) is based on a locally smoothed (over time and space) thresholded power spectrum of the received radar data.

Radar Systems

While the present invention is intended to be capable of use with all types of radar systems, much of the disclosure will assume that the radar system is a fixed, rotating, monostatic, pulsed radar system for the sake of simplicity. The disclosure is, however, fully applicable to monostatic as well as bistatic and multistatic radar systems, pulsed radar systems as well as continuous wave radar systems, synthetic aperture systems, electronically scanned radars, and the like. It also has applicability to environments other than maritime environments that experience similar backscatter noise issues.

In the example radar system, a radar transmitter/receiver antenna rotates about a point and transmits radar pulses which travel outward from the antenna, interact with targets at some distance from the antenna, and, as a result, some energy is scattered back to the antenna due to the interaction and captured as an intensity (A) corresponding to a location (range (r), azimuth ($\Theta$)) and time (t). Generally the intensity will be pre-corrected for distance. The location information may be converted to a grid position (such as latitude and longitude, or any other appropriate grid-type system) in a known manner. The temporal information may be an absolute or a relative time.

Figure 2:
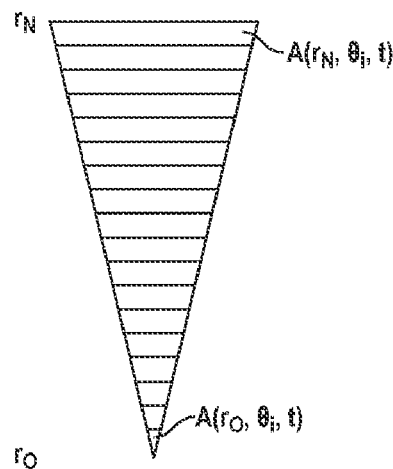
FIG. 2 is an illustration of a bin of intensity values for the slice of radar data of FIG. 1 between range values $r_0$ and $r_N$.
Figure 3:
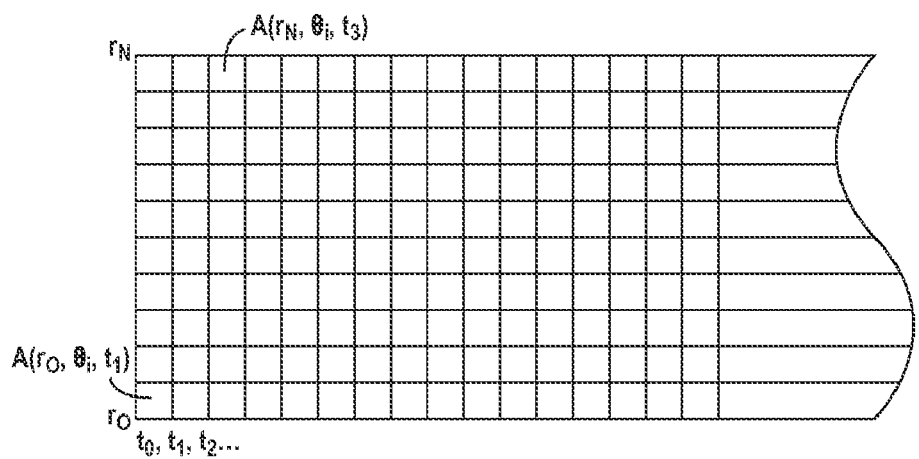
FIG. 3 is an illustration of a time sequence of the bins of FIG. 2 in the form of a two-dimensional array for a particular azimuth angle.
Figure 4:
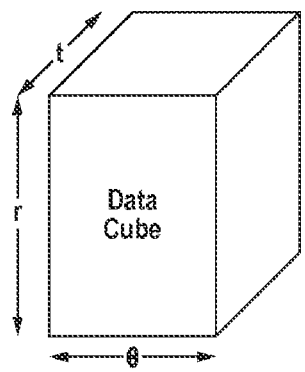
FIG. 4 is an illustration of a data cube of dimensions $\Theta$, r and t.

FIG. 1 illustrates a rotating radar scan for the slice of azimuth between $\Theta_i$ and $\Theta_{i+1}$. FIG. 2 illustrates a bin of intensity values $A(r_0, \Theta_i, t)$ through $A(r_N, \Theta_i, t)$ corresponding to the data in the slice illustrated in FIG. 1. FIG. 3 illustrates a time sequence of the bins of FIG. 2 in the form of a two-dimensional array of data for a particular azimuth value where the range is indicated by the vertical scale, the time of the data is indicated by the horizontal scale and the individual entries are intensity data. FIG. 4 illustrates a "data cube" as referred to herein which represents all of the data for all azimuth values, all range values and all time values acquired from system turn-on.

Figure 5A:
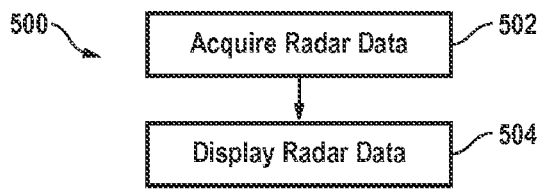
FIG. 5A is a simplified system block diagram of a radar system in accordance with the prior art.

FIG. 5A illustrates a block diagram of a conventional radar system 500 in which radar data is acquired in block 502 and displayed in some manner in block 504.

The Adaptive Clutter Filter (ACF)

Figure 5B:
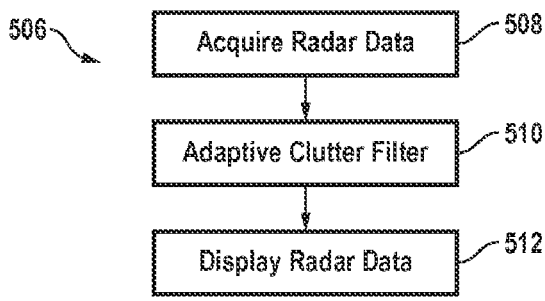
FIG. 5B is a simplified system block diagram of a radar system in accordance with an embodiment.

FIG. 5B illustrates a radar system 506 in accordance with an embodiment of the present invention in which radar data is acquired in block 508, an adaptive clutter filter is applied to reduce the correlated noise in the radar data at block 510, and the radar data is displayed or output in some manner in block 512. In accordance with one embodiment, therefore, the adaptive clutter filter functions of block 508 may be carried out in such a manner that the adaptive clutter filter is essentially "dropped in" and acts to take the raw radar data input, remove estimated clutter, and output filtered data to improve the operation of the radar system without affecting its display operations. In accordance with other embodiments the display functions may differ from those of the underlying original radar system and additional display functionality and control may be provided, if desired.

The ACF processor is an adaptive two-dimensional filter designed to operate on high resolution scanning and spotlight mode radar intensity data. On time scales less than a few hundred milliseconds, the distributions of such data are dominated by contributions from a large number of small independent scatterers (speckle) which lead to negative exponential intensity distributions. As time and length scales are increased, breaking wave phenomena associated with the maritime environment cause the clutter statistics to become correlated and non-Gaussian. The purpose of the ACF processor is to mitigate the detrimental effects (increased false alarm rates) that correlated non-Gaussian sea clutter has on detection performance via a normalization process which essentially removes the offending correlations without significantly affecting target signals.

Figure 9A:
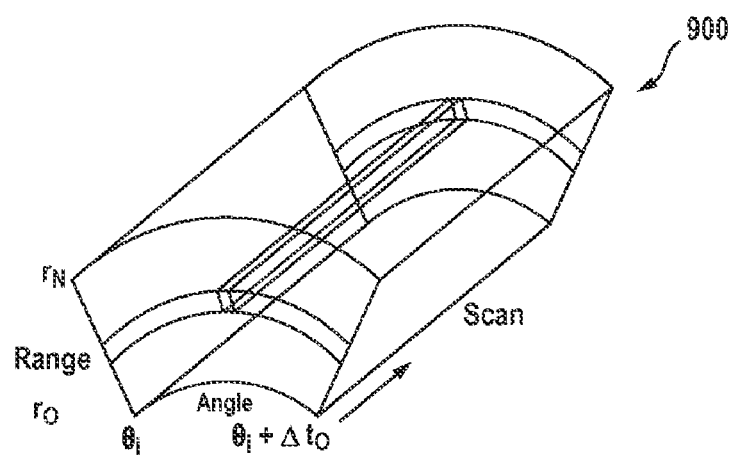
FIGS. 9A and 9B are illustrations of a processing frame of radar data.
Figure 9B:
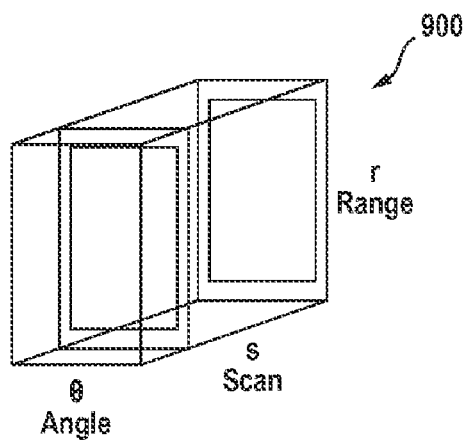

The ACF processor takes as its input a raw three-dimensional [range (r), angle ($\Theta$), scan (t)] data cube as illustrated in FIG. 4 corresponding with some coherent processing interval (CPI), and produces as its output a filtered sub-cube of the original input (FIG. 9B).

Figure 6:
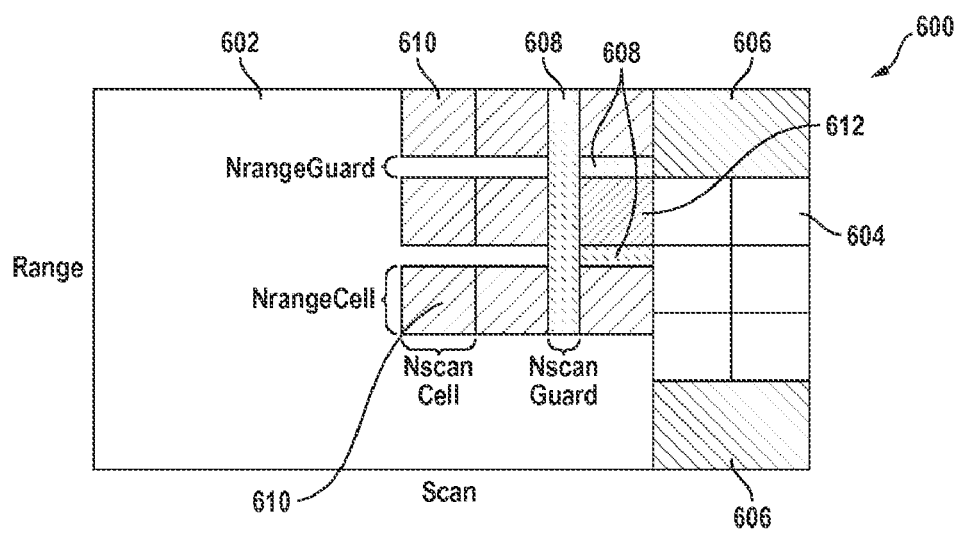
FIG. 6 is a schematic representation of the processing of a processing cell in accordance with an embodiment.

To process each raw frame, the ACF processor iterates among, and applies an adaptive kernel to each member of an overlapping set of 2-dimensional [range (r), scan (t)] processing cells, whose dimensions are determined by the parameters NrangeCell and NscanCell respectively. Appropriate values for these parameters will be on the order of the characteristic sea clutter correlation length scales. The adaptive kernel is recomputed for each processing cell under focus using local support cells whose dimensions are determined by the dimensions of the cell being filtered. The number and relative position of the kernel support cells is determined by the NrangeCellSupport and NscanCellSupport parameters. A guard region surrounding the processing cell under focus is specified by setting the parameters NrangeGuard and NscanGuard. A schematic representation of a slice 600 through the iteration is shown in FIG. 6. Here in a simple example where NrangeCellSupport=1 and NscanCellSupport=2. The raw data is denoted 602. Filtered data is denoted 604. Unfiltered data is denoted 606. Guard cells are denoted 608. Kernel support cells are denoted 610. The focus cell is denoted 612.

Figure 7:
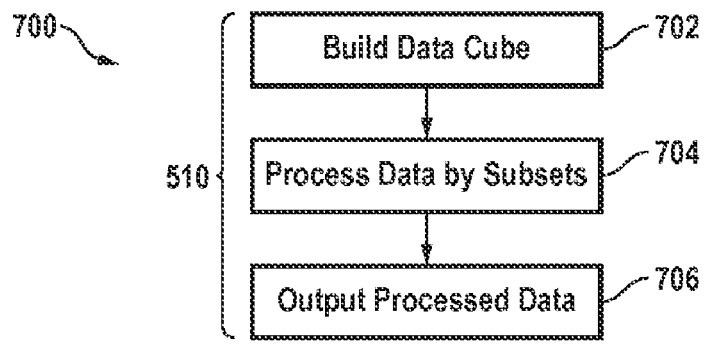
FIGS. 7, 8, 10, 11A and 11B are process flow diagrams illustrating a process in accordance with an embodiment as well as functionality of blocks of an apparatus in accordance with an embodiment.

FIG. 7 shows the operation 700 of functional block 510 in some more detail. A data cube like that of FIG. 4 is built at block 702. This requires collecting radar data for some period of time, e.g., 5-60 seconds or so, so as to populate a portion of the data cube so that steps requiring a plurality of range scans from different times may be carried out. In accordance with one embodiment the intensity data is now converted to its natural logarithm. At block 704 the data is processed by subsets. This may be carried out serially, or for improved performance, may be carried out in a parallel manner using multiple processors to handle the parallel computing tasks so as to process the data much more rapidly. At block 706 the data is output to the next stage.

Figure 8:
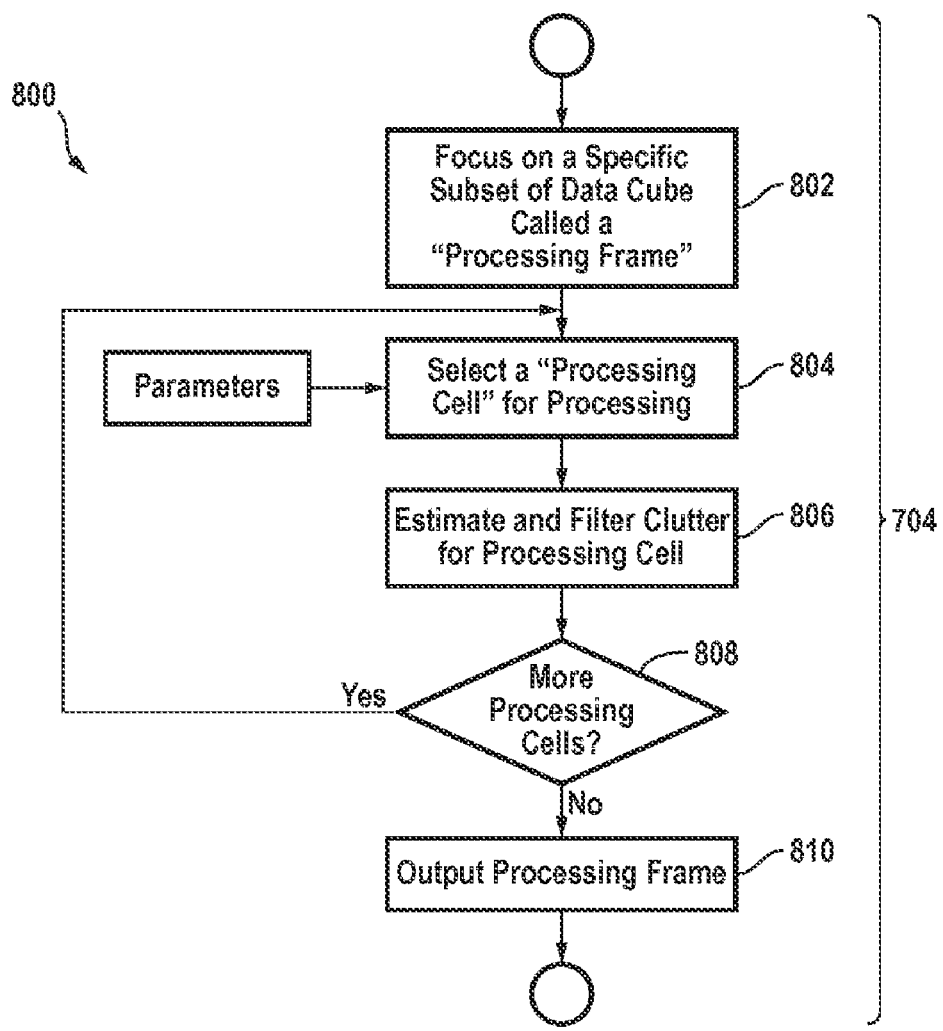

FIG. 8 is a process flow diagram illustrating the operation 800 of block 704. At block 802 the processing focuses in on a specific subset of the data cube called a "processing frame". The processing frame is a three-dimensional block of data (r, $\Theta$, t). FIGS. 9A and 9B are two illustrations of a processing frame of data 900. A processing frame 900 includes data for a range of azimuths ($\Theta$), a range of ranges (r), and a number of scans (t). Each processing frame includes a plurality of processing cells (r, t) for a number of different values of $\Theta$. At block 804 an iterative process begins in which at block 804 a processing cell is selected.

At this point the dimensions of the processing cell are determined (and may be user-adjustable) as well as other potentially adjustable parameters such as the number of guard and support cells to use.

At block 806 clutter for that processing cell is estimated and filtered from the processing cell by applying it sequentially to the data.

At block 808 the process repeats for the next processing cell (back to block 804) as long as there is another processing cell to process in the processing frame. Otherwise at block 810 the processing frame data is output to the next stage.

Figure 10:
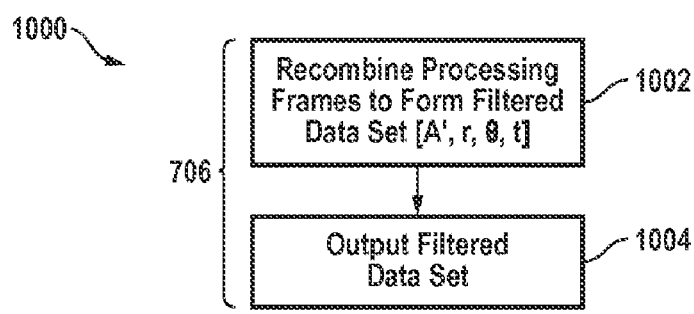

FIG. 10 is a process flow diagram illustrating the operation 1000 of block 706. At block 1002 the processing frames which were processed as described above are, in one embodiment, recombined to form a new data set [A', r, $\Theta$, t] which has it's A' intensity values changed so as to filter the correlated clutter. At block 1004 the new data set is output as required by the application, e.g., to a conventional display system, or to a customized display system which can make better use of the capabilities of the adaptive clutter filter.

Figure 11A:
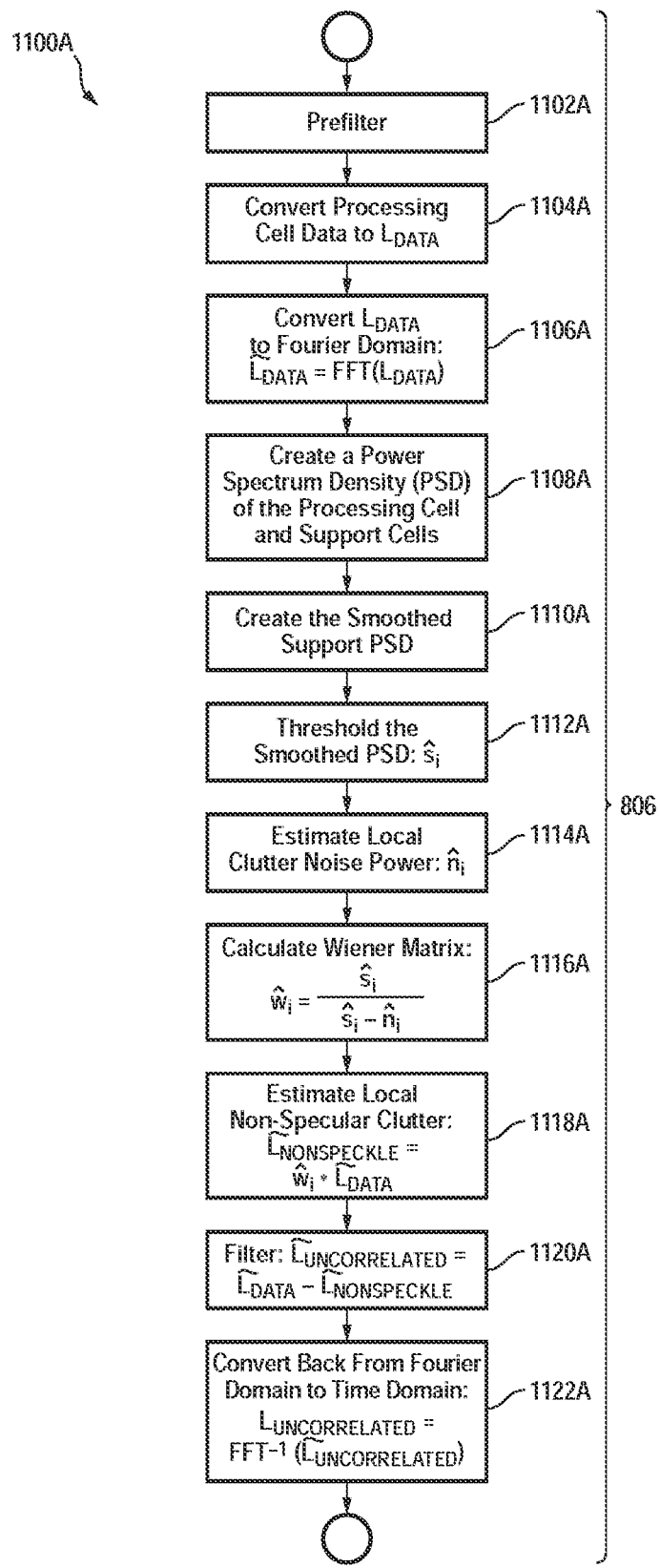
Figure 11B:
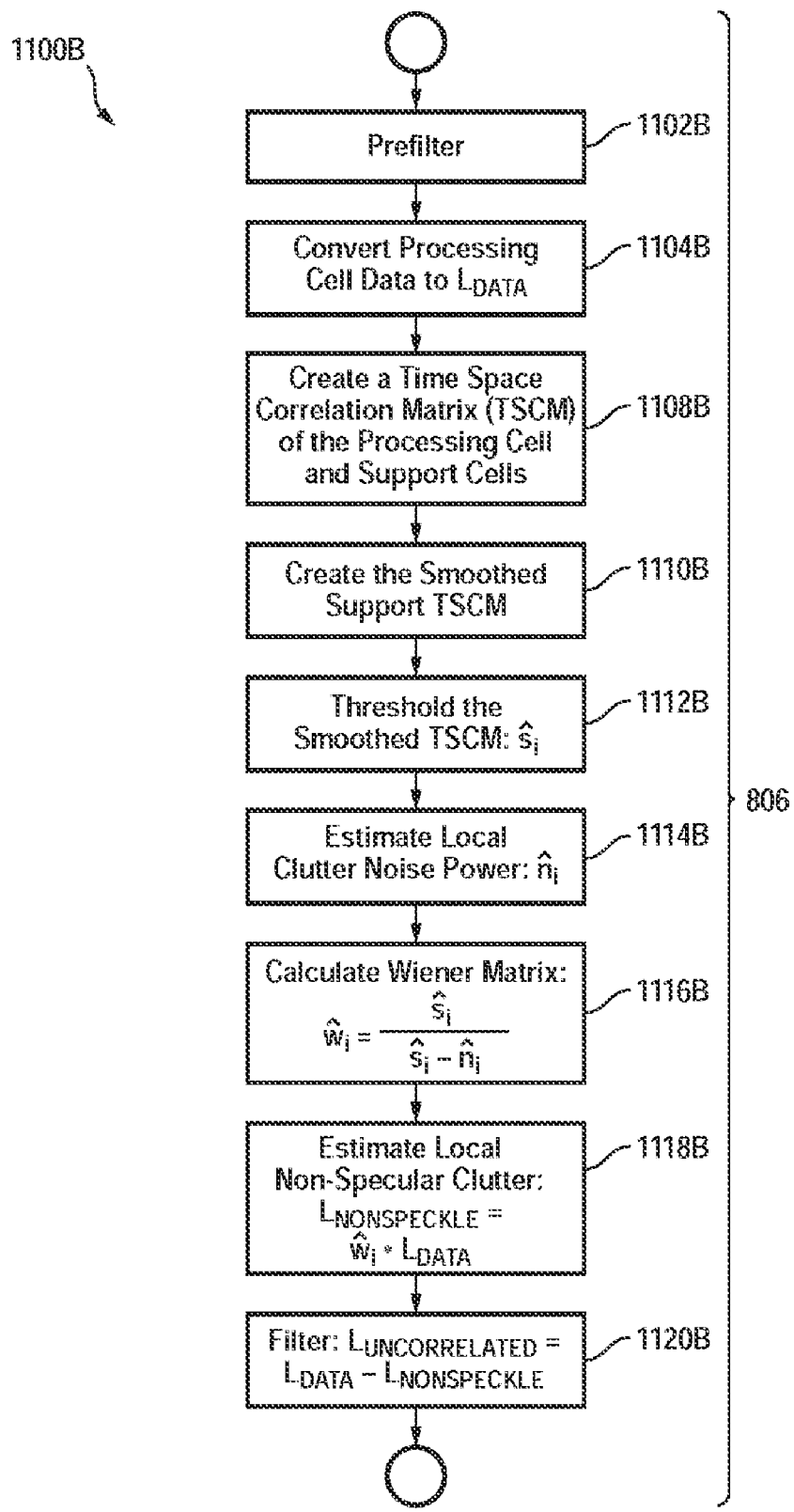

FIG. 11A and FIG. 11B represent, respectively, embodiments for carrying out the function of block 806 in the spectral or Fourier domain and in the time domain.

FIG. 11A is a process flow diagram illustrating the operation 1100A of block 806 in the Fourier domain. At block 1102A the data set corresponding to the selected processing cell is mean and median prefiltered. Such prefiltering corrects any discontinuities introduced into the data set from, e.g., automatic gain control circuits in the radar system, or other random effects. While it is presently preferred that this prefiltering step occur before block 1104A, it is possible to omit it entirely or to have it occur after block 1104A.

At block 1104A the data set is then converted to its natural log values. This log-converted data is referred to herein as $L_{DATA}$.

At block 1106A the log data $L_{DATA}$ is converted into the Fourier domain by (in one embodiment) taking a 2-dimensional (2-D) fast Fourier transform (FFT) of the processing cell, i.e., $L_{DATA}$=FFT ($L_{DATA}$) (where the italicized reference is in the Fourier domain). At block 1108A the $L_{DATA}$ and support cells are converted into power spectrum densities (PSDs) (essentially by taking the Hadamard (element-wise) product of the Fourier transformed data with itself). At block 1110A a smoothed support PSD is created by processing individual PSDs from qualifying "support" cells. Computation of the smoothed support PSD may include adaptive and recursive techniques. A number of known techniques may be used. An important point is that the smoothing function cannot be carried out using only the data from the processing cell being operated on because it would tend to eliminate the target information. Qualified cells are those cells with similar statistical characteristics to the processing cell under process—those with significant anomalies and or target signals should be discarded. A number of schemes may be employed to do this including ones based on Hough and Radon transformation in the spectral and/or temporal domain.

At block 1112A the smoothed PSD is thresholded, i.e., values less than a certain threshold value are set to zero or to another constant value. 'Soft' thresholding may also be used where rather than sharp abrupt value changes, a more gradual transition is made to zero or some other constant value. The threshold value may be made adjustable by an operator so that it may be varied in operation to achieve more optimized situation dependent results. At block 1114A the local clutter noise power for the processing cell is estimated from the data—this is the average speckle reflective power for the local processing cell and will change over time and over processing cells.

Now, at block 1116A, $w_i$=the Wiener matrix, $s_i$=the thresholded, smoothed PSD matrix, and $n_i$=the local noise clutter power estimate in matrix form. Now, $$w_i = s_i/(s_i - n_i) \quad \text{(EQ. 1)}$$

Next, the local non-speckle clutter is estimated at block 1118A as follows: The Wiener filter kernel is applied, still in the Log Fourier domain, to the processing cell to estimate the local non-speckle clutter $$L_{NONSPECKLE} = w_i * L_{DATA}. \quad \text{(EQ. 2)}$$

After the local non-speckle clutter (i.e. the detrimental correlation in the radar backscatter) has been estimated it is removed by filtering at block 1120A $$L_{UNCORRELATED} = L_{DATA} - L_{NONSPECKLE} \quad \text{(EQ. 3)}$$

to complete the filtering.

Edge aliasing artifacts may preferably be avoided in filtering step 1120A by using a windowing known technique called the Overlap-Save Method as described, for example, in Proakis et al., *Algorithms for Statistical Signal Processing*, Prentice-Hall, pp. 50-51 (2002). Using the Overlap-Save Method a series of overlapping input data blocks are processed and some of the bits of each block are discarded to avoid aliasing effects.

Finally, at block 1122A, the data is converted back from the Fourier domain:

$$L_{UNCORRELATED} = FFT^{-1}(L_{UNCORRELATED}) \quad (EQ. 4).$$

FIG. 11B is a process flow diagram illustrating the operation 1100B of block 806 in the time domain. At block 1102B the data set corresponding to the selected Processing Cell is mean and median prefiltered. Such prefiltering corrects any discontinuities introduced into the data set from, e.g., automatic gain control circuits in the radar system, or other random effects. While it is presently preferred that this prefiltering step occur before block 1104B, it is possible to omit it entirely or to have it occur after block 1104B.

At block 1104B the data set is then converted to its natural log values. This log-converted data is referred to herein as $L_{DATA}$.

At block 1108B, $L_{DATA}$ is converted into a Time Space Correlation Matrix (TSCM). At block 1110B the TSCM is smoothed by considering the data in surrounding qualifying "support" cells. Computation of the smoothed TSCM may include adaptive and recursive techniques. A number of known techniques may be used. An important point is that the smoothing function cannot be carried out using only the data from the processing cell being operated on because it would tend to eliminate the target information. Qualified cells are those cells with similar statistical characteristics to the processing cell under process—those with significant anomalies and or target signals should be discarded. A number of schemes may be employed to do this including ones based on Hough and Radon transformation in the spectral and/or temporal domain.

At block 1112B the smoothed TSCM is thresholded, i.e., values less than a certain threshold value are set to zero or to another constant value. 'Soft' thresholding may also be used where rather than sharp abrupt value changes, a more gradual transition is made to zero or some other constant value. The threshold value may be made adjustable by an operator so that it may be varied in operation to achieve more optimized situation dependent results. At block 1114B the local clutter noise power for the processing cell is estimated from the data—this is the average speckle reflective power for the local processing cell and will change over time and over processing cells.

Now, at block 1116B, $w_i$=the Wiener matrix, $s_i$=the thresholded, smoothed PSD matrix, and $n_i$=the local noise clutter power estimate in matrix form. Now, $$w_i = s_i / (s_i - n_i) \quad (EQ. 5)$$

Next, the local non-speckle clutter is estimated at block 1118B as follows: The Wiener filter kernel is applied, still in the Log domain, to the processing cell to estimate the local non-speckle clutter:

$$L_{NONSPECKLE} = w_i * L_{DATA}. \quad (EQ. 6)$$

After the Local Non-Speckle Clutter (i.e. the Detrimental Correlation in the Radar backscatter) has been estimated it is removed by filtering at block 1120B:

$$L_{UNCORRELATED} = L_{DATA} - L_{NONSPECKLE} \quad (EQ. 7)$$

to complete the filtering.

Figure 12A:
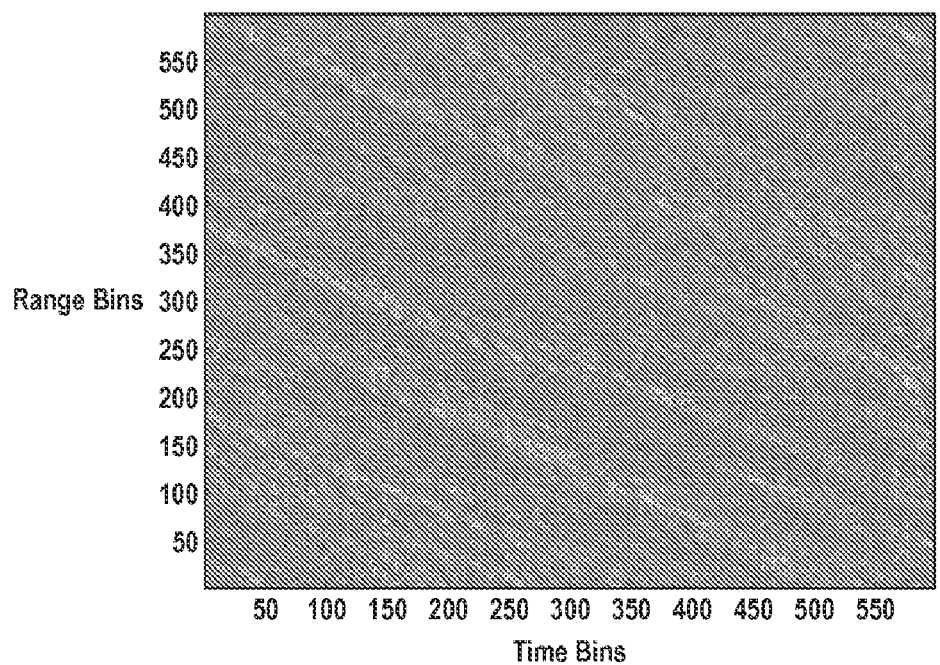
FIG. 12A is a representation of an image formed from raw, unprocessed radar data.

A raw image of intensity data prior to ACF processing is shown in FIG. 12A. This image represents backscatter from a strip of ocean spanning about 400 meters in range and 1° azimuth over a time span of 80 seconds (scan rate of 5 Hz). As can be seen strong clutter streaks obscure the target in FIG. 12A and are due to correlated wave-caused clutter.

Figure 12B:
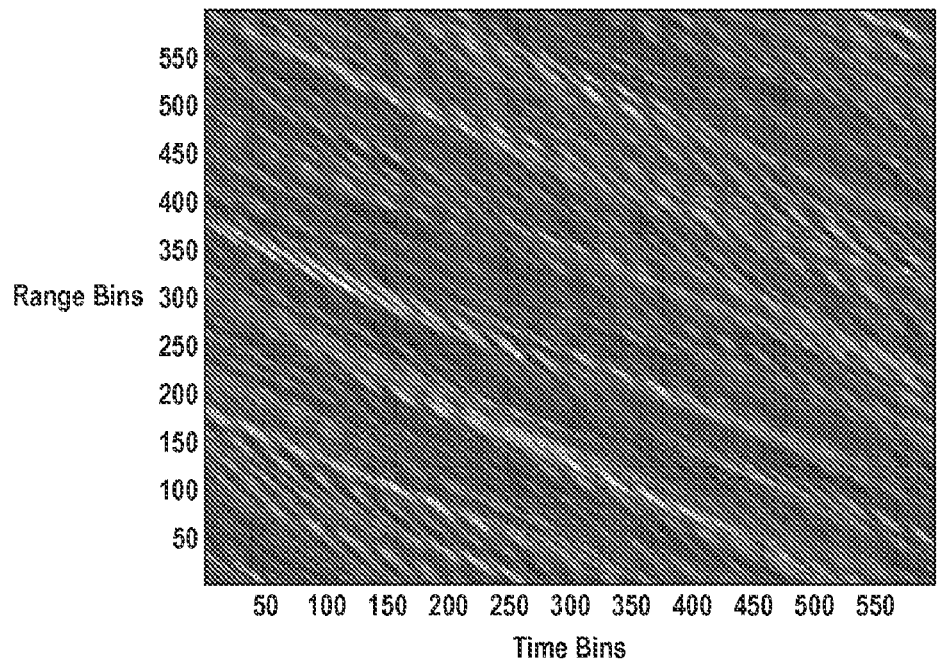
FIG. 12B is a representation of an image of a clutter estimate formed in accordance with an embodiment.

FIG. 12B is the clutter estimate formed by the ACF.

Figure 12C:
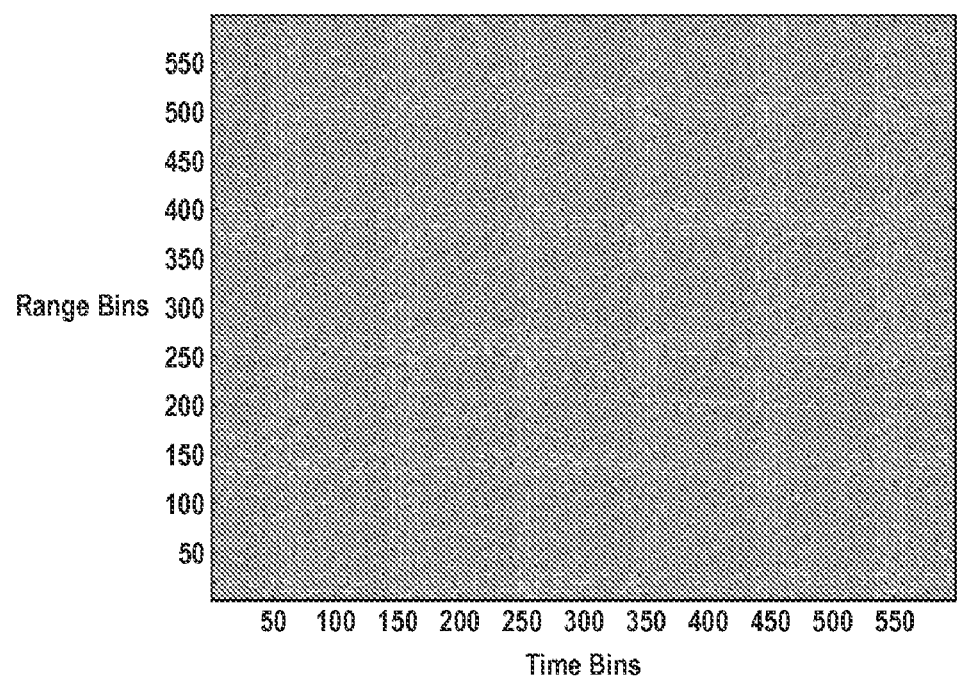
FIG. 12C is a representation of an image formed from filtering or removing the clutter estimate of FIG. 12B from the raw, unprocessed radar data of FIG. 12A.

FIG. 12C is the result of filtering the raw data of FIG. 12A with the estimate clutter of FIG. 12B. As can be seen, this image clearly shows uncorrelated speckle and the target without significant correlated clutter present to obscure the target.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method, comprising:
   obtaining a time sequence of raw radar data for a region of space;
   subdividing the raw radar data into a plurality of processing frames;
   for a processing frame, subdividing the processing frame into a plurality of processing cells and iteratively processing the processing cells of a processing frame by
     selecting a single processing cell for processing;
     transforming the radar data of the processing cell to form transformed radar data;
     performing a Fourier transform to convert the transformed radar data from the time domain to the Fourier domain (FD) to form FD radar data;
     converting the FD radar data to a FD Power Spectrum Density (FDPSD);
     smoothing the FDPSD;
     thresholding the FDPSD based upon a threshold parameter;
     estimating the speckle clutter noise power for the processing cell;
     estimating the local non-speckle clutter for the processing cell;
     removing the local non-speckle clutter from the processing cell in the Fourier domain to form filtered FD radar data; and
     performing an inverse Fourier transform to convert the filtered FD radar data back to the time domain.

2. The method of claim 1, further comprising:
   adjusting the threshold parameter.

3. The method of claim 1, further comprising:
   combining a plurality of processed processing cells into a processed processing frame.

4. The method of claim 3, further comprising:
   combining a plurality of processed processing frames into a time sequence of filtered radar data.

5. The method of claim 1, further comprising:
   using a windowing technique in the removing step.

6. The method of claim 5, wherein the windowing technique is the Overlap-Save Method.

7. The method of claim 1, wherein the transforming step includes taking a natural logarithm of the radar data.

8. The method of claim 1, wherein the processing frames are divided among more than one processor for processing.

9. An apparatus, comprising:
   means for obtaining a time sequence of raw radar data for a region of space;
   means for subdividing the raw radar data into a plurality of processing frames;

means for subdividing the processing frame into a plurality of processing cells and iteratively processing the processing cells of a processing frame by
selecting a single processing cell for processing;
transforming the radar data of the processing cell to form transformed radar data;
performing a Fourier transform to convert the transformed radar data from the time domain to the Fourier domain (FD) to form FD radar data;
converting the FD radar data to a FD Power Spectrum Density (FDPSD);
smoothing the FDPSD;
thresholding the FDPSD based upon a threshold parameter;
estimating the speckle clutter noise power for the processing cell;
estimating the local non-speckle clutter for the processing cell;
removing the local non-speckle clutter from the processing cell in the Fourier domain to form filtered FD radar data; and
performing an inverse Fourier transform to convert the filtered FD radar data back to the time domain.

10. The apparatus of claim 9, further comprising:
means for adjusting the threshold parameter.

11. The apparatus of claim 10, wherein the means for adjusting the threshold parameter is configured to be operated by an operator.

12. The apparatus of claim 9, further comprising:
means for combining a plurality of processed processing cells into a processed processing frame.

13. The apparatus of claim 12, further comprising:
means for combining a plurality of processed processing frames into a time sequence of filtered radar data.

14. The apparatus of claim 9, wherein a windowing technique is used in the removing.

15. The apparatus of claim 14, wherein the windowing technique is the Overlap-Save Method.

16. The apparatus of claim 9, wherein the transforming includes taking a natural logarithm of the radar data.

17. The apparatus of claim 9, wherein the means for processing a frame include a plurality of individual processors operating in parallel to individually process frames.

18. An apparatus, comprising:
an input device configured to receive a time sequence of raw radar data for a region of space;
a processing device configured to subdivide the raw radar data into a plurality of processing frames;
a processing device configured subdivide a processing frame into a plurality of processing cells and iteratively process the processing cells of the processing frame by
selecting a single processing cell for processing;
transforming the radar data of the processing cell to form transformed radar data;
performing a Fourier transform to convert the transformed radar data from the time domain to the Fourier domain (FD) to form FD radar data;
converting the FD radar data to a FD Power Spectrum Density (FDPSD);
smoothing the FDPSD;
thresholding the FDPSD based upon a threshold parameter;
estimating the speckle clutter noise power for the processing cell;
estimating the local non-speckle clutter for the processing cell;
removing the local non-speckle clutter from the processing cell in the Fourier domain to form filtered FD radar data; and
performing an inverse Fourier transform to convert the filtered FD radar data back to the time domain.

19. A method, comprising:
obtaining a time sequence of raw radar data for a region of space;
subdividing the raw radar data into a plurality of processing frames;
for a processing frame, subdividing the processing frame into a plurality of processing cells and iteratively processing the processing cells of a processing frame by
selecting a single processing cell for processing;
transforming the radar data of the processing cell to form transformed radar data;
converting the transformed radar data to a Time Space Correlation Matrix (TSCM);
smoothing the TSCM;
thresholding the TSCM based upon a threshold parameter;
estimating the speckle clutter noise power for the processing cell;
estimating the local non-speckle clutter for the processing cell;
removing the local non-speckle clutter from the processing cell to form filtered radar data.

20. The method of claim 19, further comprising:
adjusting the threshold parameter.

21. The method of claim 19, further comprising:
combining a plurality of processed processing cells into a processed processing frame.

22. The method of claim 21, further comprising:
combining a plurality of processed processing frames into a time sequence of cleaned radar data.

23. The method of claim 19, wherein the transforming the radar data includes taking a natural logarithm of the radar data.

24. The method of claim 19, wherein the processing frames are divided among more than one processor for processing.

25. An apparatus, comprising:
means for obtaining a time sequence of raw radar data for a region of space;
means for subdividing the raw radar data into a plurality of processing frames;
means for subdividing the processing frame into a plurality of processing cells and iteratively processing the processing cells of a processing frame by
selecting a single processing cell for processing;
transforming the radar data of the processing cell to form transformed radar data;
converting the transformed radar data to a Time Space Correlation Matrix (TSCM);
smoothing the TSCM;
thresholding the TSCM based upon a threshold parameter;
estimating the speckle clutter noise power for the processing cell;
estimating the local non-speckle clutter for the processing cell;
removing the local non-speckle clutter from the processing cell to form filtered radar data.

26. The apparatus of claim 25, further comprising:
means for adjusting the threshold parameter.

27. The apparatus of claim 26, wherein the means for adjusting the threshold parameter is configured to be operated by an operator.

28. The apparatus of claim 25, further comprising:
means for combining a plurality of processed processing cells into a processed processing frame.

29. The apparatus of claim 28, further comprising:
means for combining a plurality of processed processing frames into a time sequence of cleaned radar data.

30. The apparatus of claim 25, wherein the transforming the radar data includes taking a natural logarithm of the radar data.

31. The apparatus of claim 25, wherein the means for processing a frame include a plurality of individual processors operating in parallel to individually process frames.

32. An apparatus, comprising:
an input device configured to receive a time sequence of raw radar data for a region of space;
a processing device configured to
subdivide the raw radar data into a plurality of processing frames;
subdivide a processing frame into a plurality of processing cells; and
iteratively process the processing cells of the processing frame by
selecting a single processing cell for processing;
transforming the radar data of the processing cell to form transformed radar data;
converting the transformed radar data to a Time Space Correlation Matrix (TSCM);
smoothing the TSCM;
thresholding the TSCM based upon a threshold parameter;
estimating the speckle clutter noise power for the processing cell;
estimating the local non-speckle clutter for the processing cell; and
removing the local non-speckle clutter from the processing cell to form filtered radar data.

* * * * *